US011677220B2

(12) United States Patent
Morrow

(10) Patent No.: US 11,677,220 B2
(45) Date of Patent: Jun. 13, 2023

(54) LOW PROFILE CABLE CLEAT ASSEMBLY

(71) Applicant: Panduit Corp., Tinley Park, IL (US)

(72) Inventor: Russell K. Morrow, Tinley Park, IL (US)

(73) Assignee: Panduit Corp., Tinley Park, IL (US)

( * ) Notice: Subject to any disclaimer, the term of this patent is extended or adjusted under 35 U.S.C. 154(b) by 28 days.

(21) Appl. No.: 17/377,825

(22) Filed: Jul. 16, 2021

(65) Prior Publication Data

US 2022/0037866 A1     Feb. 3, 2022

Related U.S. Application Data

(60) Provisional application No. 63/058,007, filed on Jul. 29, 2020.

(51) Int. Cl.
    *H02G 3/04*     (2006.01)
    *F16L 3/10*     (2006.01)
    *F16L 3/233*     (2006.01)

(52) U.S. Cl.
    CPC .......... *H02G 3/0406* (2013.01); *F16L 3/1058* (2013.01); *F16L 3/233* (2013.01); *H02G 3/0456* (2013.01)

(58) Field of Classification Search
    CPC .. H02G 3/0406; H02G 3/0456; H02G 3/0443; H02G 3/32; F16L 3/233; F16L 3/237; F16L 33/04; F16L 3/1058; F16L 3/23; F16L 3/137; Y10T 24/1441
    See application file for complete search history.

(56) References Cited

U.S. PATENT DOCUMENTS

| | | | | |
|---|---|---|---|---|
| 508,822 A | * | 11/1893 | Evory | F16L 3/2235 248/74.1 |
| 2,828,525 A | * | 4/1958 | Gail | F16L 33/04 24/279 |
| 2,939,664 A | * | 6/1960 | Wesseler | F16L 3/14 24/301 |
| 4,179,774 A | * | 12/1979 | Bradbury | F16G 11/048 248/68.1 |
| 4,365,393 A | * | 12/1982 | Hauffe | F16L 55/172 285/373 |
| 4,397,436 A | * | 8/1983 | Lyon | F16L 3/233 248/68.1 |

(Continued)

FOREIGN PATENT DOCUMENTS

| | | |
|---|---|---|
| CN | 108697026 A | 10/2018 |
| EP | 1195531 B1 | 7/2003 |

(Continued)

*Primary Examiner* — Christopher Garft
(74) *Attorney, Agent, or Firm* — Christopher S. Clancy; James H. Williams; Aimee E. McVady

(57) ABSTRACT

A cable cleat assembly used to secure cables to a wire basket for cable management. The cable cleat assembly includes a base plate that receives the cables and a stainless steel strap that maintains the cables on the base plate. The stainless steel strap has a first end member and a second end member. The stainless strap is positioned over the cables on the base plate with the first end member and the second end member wrapped under the base plate. Clamp bars are positioned within the first end member and the second end member. Fasteners extend through the clamp bars, the first end member, and the second end member to secure the cable cleat assembly to the wire basket.

18 Claims, 4 Drawing Sheets

(56) References Cited

U.S. PATENT DOCUMENTS

| | | | |
|---|---|---|---|
| 4,440,374 A | 4/1984 | Achille | |
| 5,221,065 A * | 6/1993 | Siems | F16L 3/137 248/65 |
| 6,634,607 B2 * | 10/2003 | Vogel | F01N 13/1805 285/373 |
| 6,729,606 B1 * | 5/2004 | Durin | H02G 3/0443 254/395 |
| 7,223,052 B1 * | 5/2007 | Evans | F16L 1/10 248/68.1 |
| 7,654,492 B2 | 2/2010 | Balderama et al. | |
| 8,424,814 B2 | 4/2013 | Davis et al. | |
| 8,684,319 B2 | 4/2014 | Brouwer et al. | |
| 8,757,559 B2 | 6/2014 | Davis et al. | |
| 9,178,343 B2 | 11/2015 | Brouwer et al. | |
| 10,378,679 B2 | 8/2019 | Booth et al. | |
| 2006/0039667 A1 * | 2/2006 | McCrary | H02G 3/0406 385/136 |
| 2009/0200435 A1 * | 8/2009 | Duggan | F16L 3/137 248/74.1 |
| 2010/0059250 A1 * | 3/2010 | Letourneur | H02G 3/0443 174/135 |

FOREIGN PATENT DOCUMENTS

| | | |
|---|---|---|
| EP | 3557710 A1 | 10/2019 |
| GB | 722084 | 1/1955 |
| GB | 2473492 A | 3/2011 |
| JP | 4864503 B2 | 2/2012 |
| KR | 10-1088511 B1 | 11/2011 |
| KR | 10-1303094 B1 | 9/2013 |
| KR | 10-1339144 B1 | 12/2013 |
| KR | 10-1582285 B1 | 1/2016 |
| KR | 10-1848847 B1 | 4/2018 |
| KR | 10-2019-0075760 A | 7/2019 |
| KR | 10-2009659 B1 | 8/2019 |
| WO | 2019236445 A1 | 12/2019 |

\* cited by examiner

LOW PROFILE CABLE CLEAT ASSEMBLY

CROSS REFERENCE TO RELATED APPLICATION(S)

This application claims benefit to U.S. Provisional Patent Application No. 63/058,007, filed on Jul. 29, 2020, the entirety of which is hereby incorporated by reference herein.

FIELD OF THE INVENTION

The present invention relates to a cable cleat, and more particularly to a low profile cable cleat for installing cables on a wire basket.

BACKGROUND OF THE INVENTION

In some electrical cable installations, a wire basket is used for cable management. Unlike standard ladder rack arrangements, wire baskets are stacked close together. As a result, installing a typical trefoil cable cleat on the wire basket is very difficult due to the overall height of the typical trefoil cable arrangement. It is desirable to provide a cable cleat assembly that secures trefoil cables in an area with height and installation constraints.

SUMMARY OF THE INVENTION

A cable cleat assembly used to secure cables on a wire basket for cable management. The cable cleat assembly includes a base plate, a stainless steel strap, clamp bars, and fasteners. The base plate receives the cables and the stainless steel strap maintains the cables on the base plate. The stainless steel strap has a first end member and a second end member. The stainless strap is positioned over the cables on the base plate with the first end member and the second end member wrapped under the base plate. The clamp bars are positioned within the first end member and the second end member. The fasteners extend through the clamp bars, the first end member, and the second end member to secure the cable cleat assembly.

DETAILED DESCRIPTION

Figure 1:
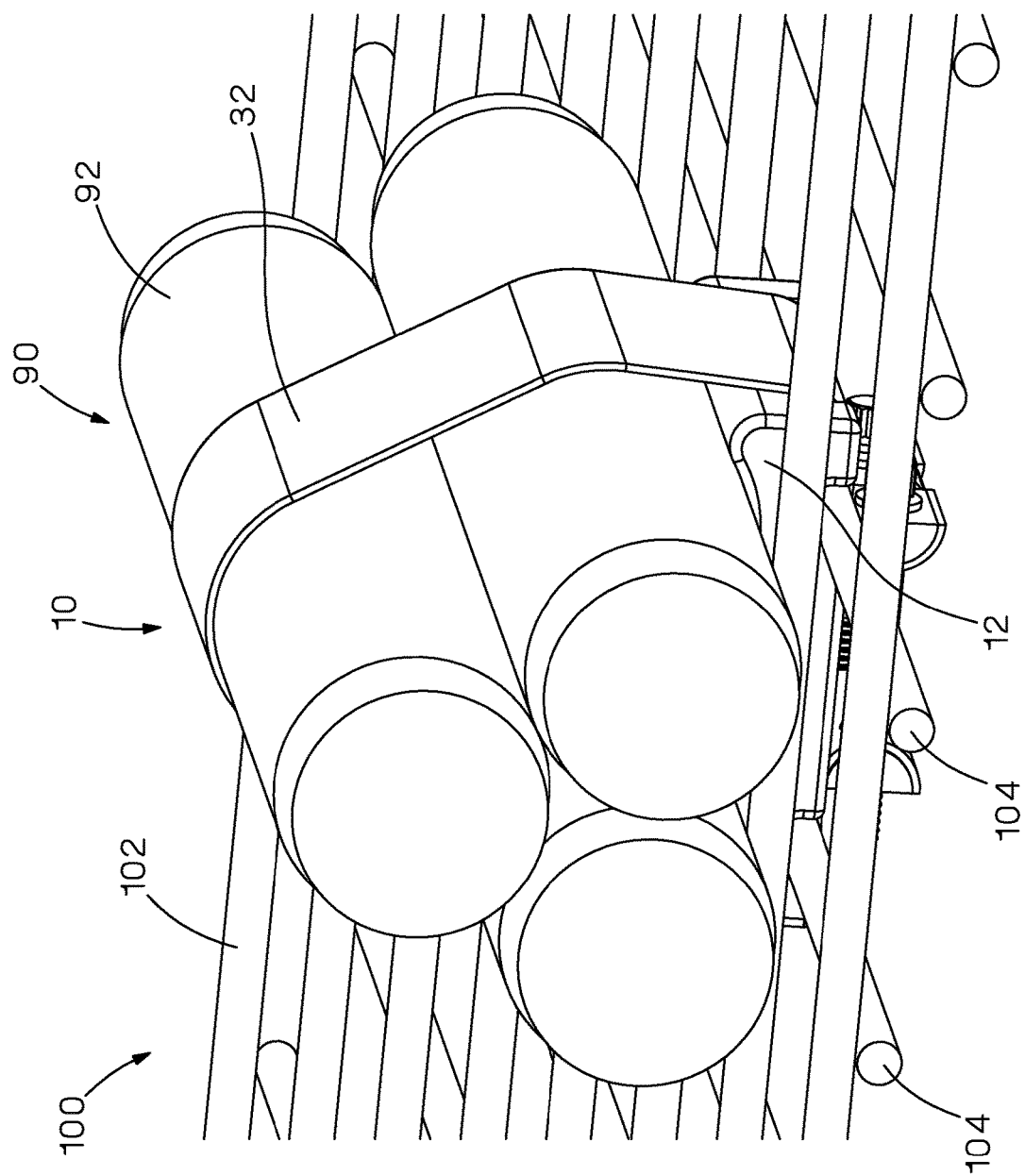
FIG. 1 is a perspective view of the cable cleat assembly of the present invention installing cables on a wire basket.

FIG. 1 illustrates the cable cleat assembly 10 of the present invention securing a trefoil cable arrangement 90 to a section of a wire basket 100. The cable cleat assembly 10 is positioned between adjacent longitudinal wires 104 and adjacent transverse wires 102 of the wire basket 100.

Figure 2:
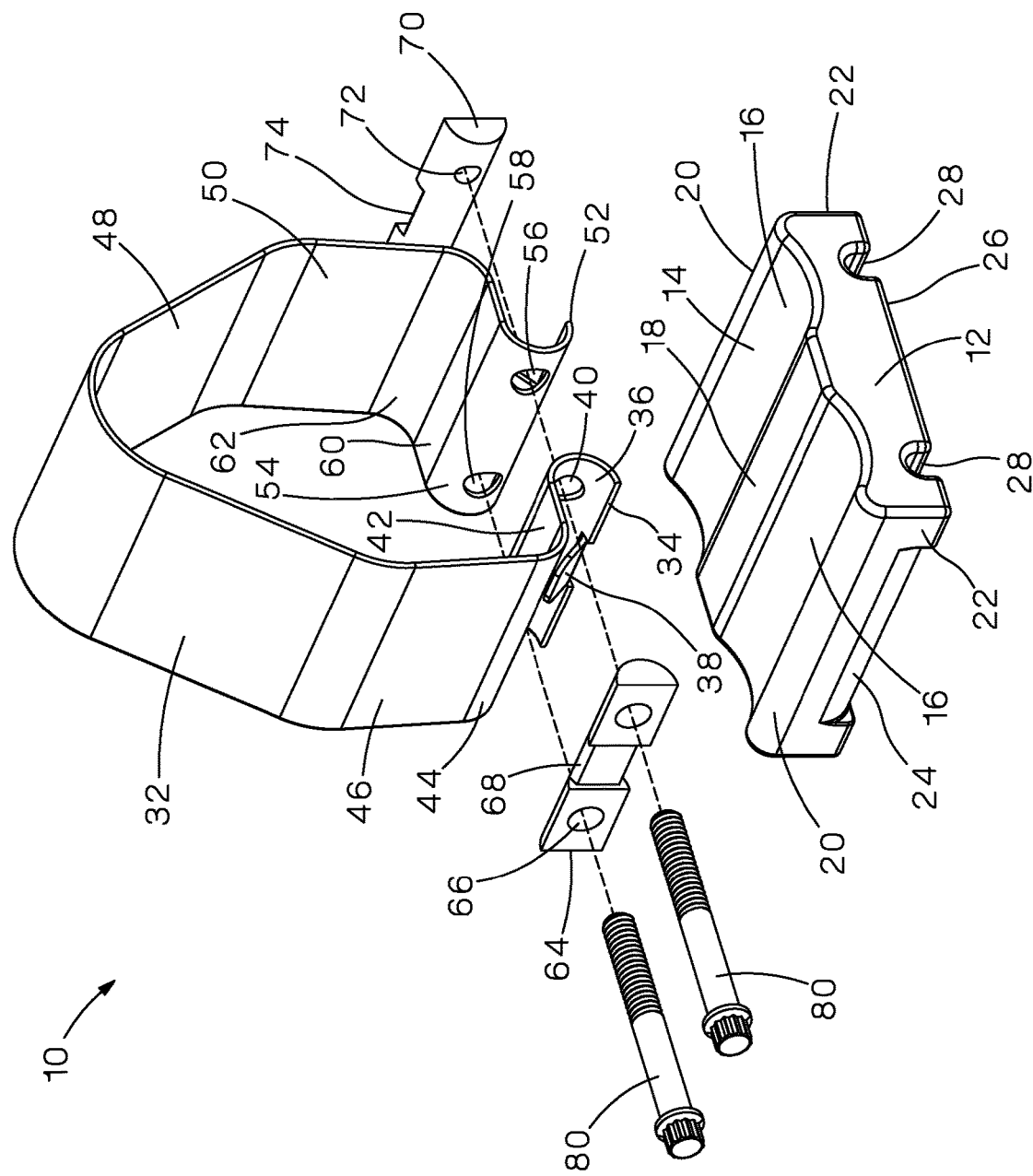
FIG. 2 is an exploded perspective view of the cable cleat assembly of FIG. 1.
Figure 4:
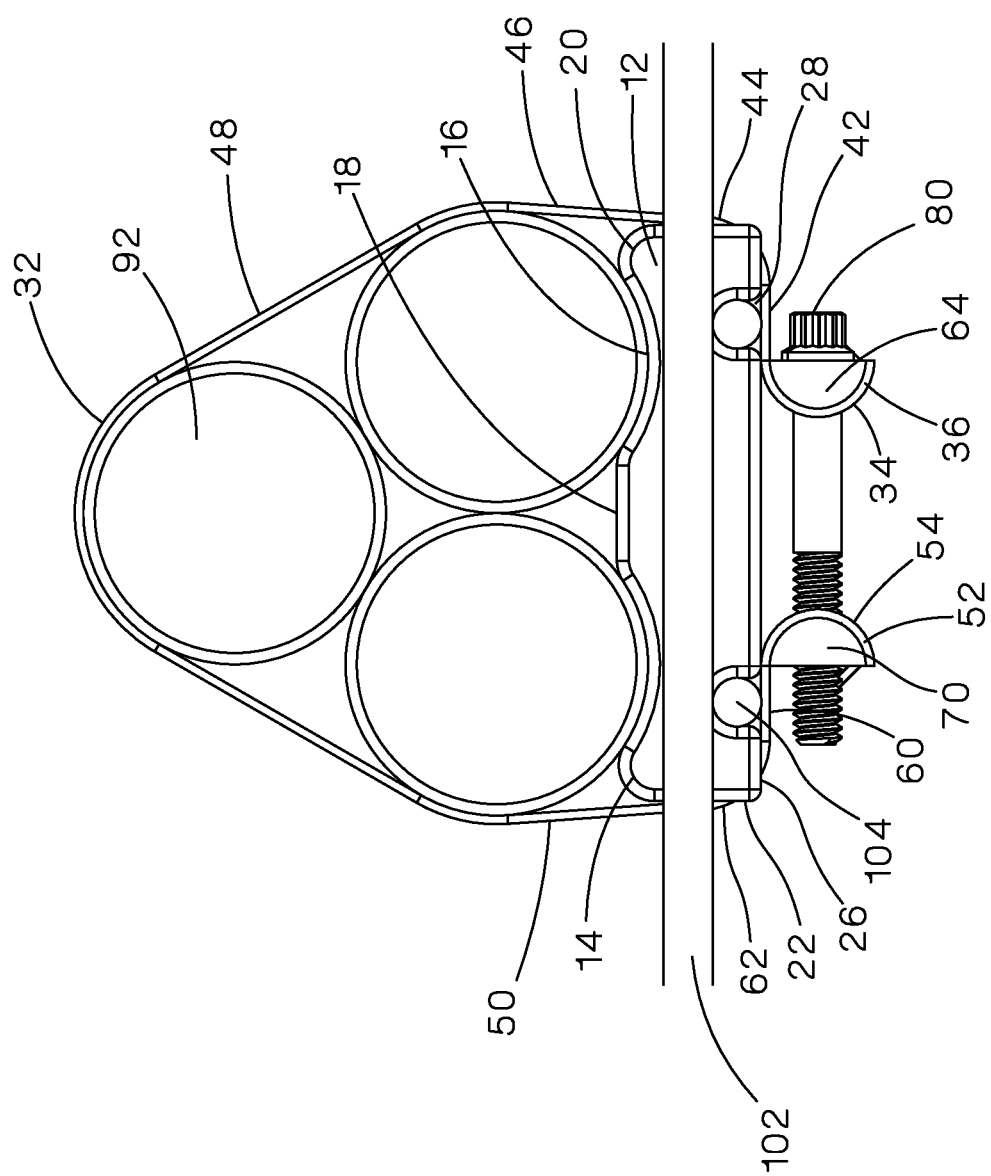
FIG. 4 is a front view of the cable cleat assembly of FIG. 1.

As illustrated in FIG. 2, the cable cleat assembly 10 includes a polymer base plate 12, a preformed round edge stainless steel strap 32, clamp bars 64, 70 and fasteners 80. The polymer base plate 12 has a top contoured surface 14 with two indentations 16 and a flat center member 18 between the indentations 16. The side edges 20 of the top contour surface 14 are curved and lead to vertical sides 22. As illustrated in FIGS. 1 and 4, the bottom two cables 92 of the trefoil cable arrangement 90 are positioned in the indentations 16 in the base plate 12. The curved side edges 20 and the flat center member 18 prevent the cables 92 from moving once the cables 92 are positioned in the indentations 16. A third cable 92 is positioned on the bottom two cables 92 to form the trefoil cable arrangement 90.

Each side 22 of the base plate 12 is vertical with a strap centering notch 24. The strap centering notch 24 maintains the stainless steel strap 32 in position over the trefoil cable arrangement 90.

The bottom 26 of the base plate 12 includes two semi-circular openings 28. The semi-circular openings 28 are sized and spaced to receive adjacent longitudinal wires 104 of a wire basket 100.

The preformed round edge stainless steel strap 32 includes a first end member 34, a first vertical straight side 46, a curved generally U-shaped center member 48, a second vertical straight side 50, and a second end member 52. The first end member 34 and the second end member 52 each include a generally C-shaped portion 36, 54, a horizontal portion 42, 60, and a curved portion 44, 62 that leads to the first vertical straight side 46 and the second vertical straight side 50, respectively. The generally C-shaped portions 36, 54 include a center retaining tab 38, 56 and two holes 40, 58, respectively, with one hole 40, 58 positioned on each side of the retaining tab 38, 56.

The first end member 34 and the second end member 52 are both designed to receive a clamp bar 64, 70, respectively. As illustrated in FIG. 2, the clamp bars 64, 70 are a half cylinder with two holes 66, 72 and a center indentation 68, 74. The holes 66 in the clamp bar 64 that is installed in the first end member 34 are clearance holes extending through the clamp bar 64. The holes 72 in the clamp bar 70 that is installed in the second end member 52 are tapped holes 72.

Figure 3:
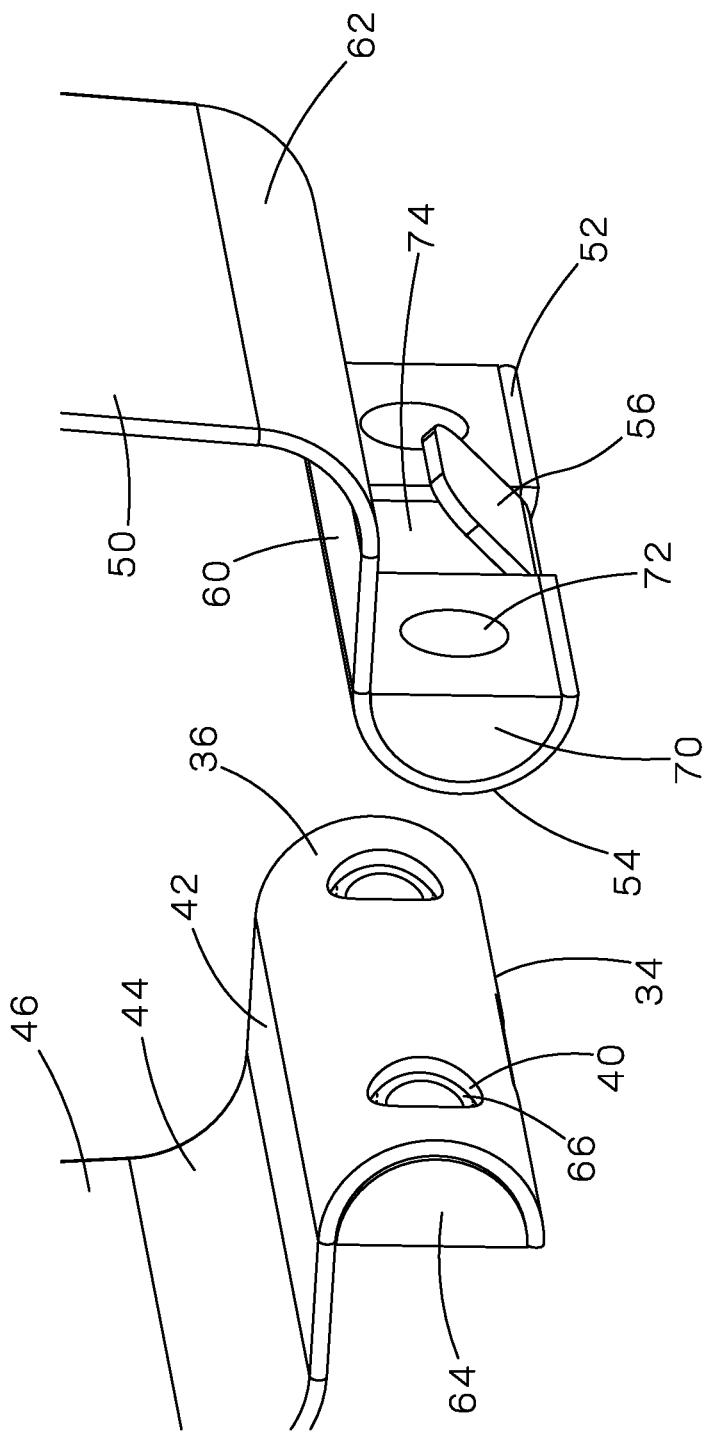
FIG. 3 is a perspective view of the first end member and the second end member of the round edge stainless steel strap of FIG. 2 with the clamp bars installed therein.

FIG. 3 illustrates the first end member 34 and the second end member 52 with the clamp bars 64, 70, respectively, installed therein. The clamp bars 64, 70 are retained within the end members 34, 52 of the rounded edge stainless steel strap 32 by the tabs 38, 56 extending from the center of the end members 34, 52. Once the clamp bars 64, 70 are positioned in the end members 34, 52 the tabs 38, 56 are bent inwards to cover the indentations 68, 74 in the clamp bars 64, 70. This initial retention prevents the clamp bars 64, 70 from coming loose during assembly and increases the clamping strength of the cable cleat assembly 10.

The preformed round edge stainless steel strap 32 is designed to be placed over the trefoil cable arrangement 90 and the base plate 12. As illustrated in FIG. 4, the end members 34, 52 of the stainless steel strap 32 are wrapped under the base plate 12. Two flange bolts 80 are the fasteners that are used to secure the stainless steel strap 32. However, other types of fasteners may be used to secure the stainless steel strap 32, if desired. The flange bolts 80 are inserted through the clearance holes 66 in the clamp bar 64 and threaded into the tapped holes 72 in the clamp bar 70. The flange bolts 80 are tightened with a power tool having a torque limiting clutch and a 12 point socket. During installation of the flange bolts 80, the installer alternates between the bolts 80 to prevent the cable cleat assembly 10 from twisting. The flange bolts 80 are tightened until the cables 92 are tight. Damage to the cable insulation is avoided by limiting the installation torque to the prescribed torque setting.

The cable cleat assembly 10 of the present invention provides an easy to assembly cable cleat that maintains a lower overall height on the wire basket 100. The cable cleat assembly 10 is installed with a tool from only one side. The base plate 12 isolates the cables 92 from the clamping hardware and the rounded stainless steel strap edges prevent cable damage without the use of a cushion sleeve.

Furthermore, while the particular preferred embodiments of the present invention have been shown and described, it will be obvious to those skilled in the art that changes and modifications may be made without departing from the teaching of the invention. The matter set forth in the foregoing description and accompanying drawings is offered by way of illustration only and not as limitation.

I claim:

1. A cable cleat assembly for securing cables to a wire basket, the cable cleat assembly comprising:
    a base plate for receiving the cables, wherein the base plate has a bottom with semi-circular openings, the semi-circular openings adapted to receive wires of the wire basket;
    a stainless steel strap for maintaining the cables on the base plate, wherein the stainless steel strap having a first end member and a second end member, the stainless strap is positioned over the cables on the base plate with the first end member and the second end member wrapped under the base plate;
    clamp bars positioned within the first end member and the second end member; and
    fasteners extending through the clamp bars, the first end member, and the second end member to secure the cable cleat assembly.

2. The cable cleat assembly of claim 1, wherein the base plate has a top contoured surface with two indentations and a flat center member positioned between the indentations, whereby the cables are positioned in the indentations.

3. The cable cleat assembly of claim 2, wherein the top contoured surface of the base plate has curved side edges that lead to vertical sides of the base plate.

4. The cable cleat assembly of claim 1, wherein the base plate has a first vertical side and a second vertical side, each side has a strap centering notch, the strap centering notches adapted to maintain the stainless steel strap in position over the cables.

5. The cable cleat assembly of claim 1, wherein the stainless steel strap further comprising a first vertical straight side extending from the first end member, a curved U-shaped center member, and a second vertical straight side leading to the second end member.

6. The cable cleat assembly of claim 1, wherein the clamp bars are a half cylinder with two holes and a center indentation.

7. The cable cleat assembly of claim 1, wherein the fasteners extend through clearance holes in the clamp bar positioned in the first end member and the fasteners are threaded into tapped holes in the clamp bar positioned in the second end member.

8. The cable cleat assembly of claim 1, wherein the stainless steel strap has rounded edges for preventing cable damage.

9. A cable cleat and wire basket assembly for routing cables, the cable cleat and wire basket assembly comprising:
    a wire basket having a plurality of longitudinal wires and a plurality of transverse wires;
    a cable cleat secured to the wire basket, the cable cleat having a base plate with a bottom having semi-circular openings, the semi-circular openings receive the longitudinal wires of the wire basket; a stainless steel strap for maintaining the cables on the base plate, wherein the stainless steel strap having a first end member and a second end member, the stainless strap is positioned over the cables on the base plate with the first end member and the second end member wrapped under the base plate;
    clamp bars positioned within the first end member and the second end member; and
    fasteners extending through the clamp bars, the first end member, and the second end member to secure the cable cleat assembly.

10. The cable cleat and wire basket assembly of claim 9, wherein the base plate has a top contoured surface with two indentations, a flat center member positioned between the indentations, and curved side edges that lead to vertical sides of the base plate, whereby the cables are positioned in the indentations.

11. The cable cleat and wire basket assembly of claim 9, wherein the base plate has a first vertical side and a second vertical side, each side has a strap centering notch, the strap centering notches adapted to maintain the stainless steel strap in position over the cables.

12. The cable cleat and wire basket assembly of claim 9, wherein the stainless steel strap further comprising a first vertical straight side extending from the first end member, a curved U-shaped center member, a second vertical straight side leading to the second end member, and rounded edges for preventing cable damage.

13. The cable cleat and wire basket assembly of claim 9, wherein the first end member and the second end member of the stainless steel strap each includes a C-shaped portion, a horizontal portion, and a curved portion, wherein the C-shaped portions of the first end member and the C-shaped portions of the second end member each include a center retaining tab and holes positioned on each side of the center retaining tab, wherein the clamp bars include a center indentation with a hole on each side of the center indentation, whereby the holes in the clamp bars align with the holes in the C-shaped portions when the clamp bars are positioned within the first end member and the second end member.

14. The cable cleat and wire basket assembly of claim 9, wherein the clamp bars are a half cylinder with two holes and a center indentation.

15. The cable cleat and wire basket assembly of claim 9, wherein the fasteners extend through clearance holes in the clamp bar positioned in the first end member and the fasteners are threaded into tapped holes in the clamp bar positioned in the second end member.

16. A cable cleat assembly for securing cables to a wire basket, the cable cleat assembly comprising:
    a base plate for receiving the cables;
    a stainless steel strap for maintaining the cables on the base plate, wherein the stainless steel strap having a first end member and a second end member, the stainless strap is positioned over the cables on the base plate with the first end member and the second end member wrapped under the base plate;
    wherein the first end member and the second end member of the stainless steel strap each includes a C-shaped portion, a horizontal portion, and a curved portion, wherein the C-shaped portions of the first end member and the C-shaped portions of the second end member each include a center retaining tab and holes positioned on each side of the center retaining tab;
    clamp bars positioned within the first end member and the second end member; and fasteners extending through the clamp bars, the first end member, and the second end member to secure the cable cleat assembly.

17. The cable cleat assembly of claim 16, wherein the clamp bars include a center indentation with a hole on each side of the center indentation, whereby the holes in the clamp bars align with the holes in the C-shaped portions when the clamp bars are positioned within the first end member and the second end member.

18. The cable cleat assembly of claim 17, wherein the center retaining tab of the first end member and the center retaining tab of the second end member cover the center indentations of the clamp bars.

\* \* \* \* \*